United States Patent [19]

Takeuchi et al.

[11] 4,105,745

[45] Aug. 8, 1978

[54] CATALYST AND PROCESS FOR REDUCING NITROGEN OXIDES

[75] Inventors: Junji Takeuchi; Shigeru Itou, both of Ube; Kousuke Itou, Yamaguchi, all of Japan

[73] Assignee: Ube Industries, Ltd., Ube, Japan

[21] Appl. No.: 632,528

[22] Filed: Nov. 17, 1975

[51] Int. Cl.$^2$ .................. C01B 21/00; B01J 27/02; B01J 23/16; B01J 23/84

[52] U.S. Cl. .................. 423/239; 423/351; 252/440; 252/465; 252/470

[58] Field of Search .............. 252/440, 470, 465; 423/239, 351

[56] References Cited

U.S. PATENT DOCUMENTS

| | | | |
|---|---|---|---|
| 3,669,906 | 6/1972 | Koberstein | 252/470 X |
| 3,923,696 | 12/1925 | Chart et al. | 252/470 X |
| 3,970,739 | 7/1976 | Shiraishi et al. | 423/239 |
| 3,993,731 | 11/1976 | Morikawa et al. | 423/239 |

FOREIGN PATENT DOCUMENTS

| | | | |
|---|---|---|---|
| 1,259,298 | 1/1968 | Fed. Rep. of Germany | 252/470 |
| 131,849 | 10/1975 | Japan. | |
| 131,848 | 10/1975 | Japan. | |
| 50-6591 | 1975 | Japan | 252/440 |

OTHER PUBLICATIONS

Chemical Abstracts, vol. 84, 1976, p. 307 21,719r, Removal of NO$_x$ from Waste Gases by Catalytic Reduction with Ammonia.

Chemical Abstracts, vol. 84, 1976, p. 307 21,720j, Removal of Nitrogen Oxides from Waste Gas by Catalytic Reduction.

Chemical Abstracts, vol. 83, 1975, p. 253 168,157u, Iron Oxide Catalyst for Reduction of NO$_x$ with Ammonia.

Chemical Abstracts, vol. 83, 1975, p. 280 32,547p & 32,548q, Title's the Same, Catalyst for Reduction of NO$_x$ in Exhaust Gases with Ammonia.

Chemical Abstracts, vol. 83, 1975, p. 309 15,102x & 15,104z, Title's the Same, Catalyst for Reduction of Nitrogen Oxide in Exhaust Gases with Ammonia.

*Primary Examiner*—Patrick P. Garvin
*Assistant Examiner*—William G. Wright
*Attorney, Agent, or Firm*—Miller & Prestia

[57] ABSTRACT

A catalyst comprising an iron-chromium-oxygen type catalyst base and 0.1 through 20% of aluminum sulfate based on the weight of the above-mentioned catalyst base, is useful for reducing nitrogen oxides with ammonia at a temperature of 150° C or higher, to convert it to nitrogen and water.

13 Claims, No Drawings

CATALYST AND PROCESS FOR REDUCING NITROGEN OXIDES

The present invention relates to a catalyst and process for reducing nitrogen oxides with ammonia. More particularly, the present invention relates to a catalyst and process for converting nitrogen oxides to nitrogen and water by catalytically reducing it with ammonia.

Recently, a large amount of nitrogen oxides (NOx) are exhaust from internal combustion engines, steam-power plants, kilns for producing cement, burning furnaces and factories for producing nitric acid or nitrates, and causes polution of the atmosphere. Under these circumstances, it is desired to convert the nitrogen oxides in exhaust gas into harmless substances, that is, nitrogen and water, by a simple method.

Japanese Patent Application Laying-open No. 6591/1975 discloses that a catalyst which comprises at least one oxygen-and-sulphur-containing compound of iron, copper, chromium, manganese, vanadium, nickel and titanium, is effective for catalytically reducing nitrogen oxides with ammonia.

German Pat. No. 1,259,298 discloses a catalyst for reducing nitrogen oxides with ammonia, which catalyst comprises an oxide of a metal in Groups VI-VIIIb in the Periodic Table, especially, chromium oxides and/or iron oxides.

From the point of view of industrial utilization, it is important that the catalyst be capable of maintaining its catalytic activity at a high level over a long period of time. That is, it is desired that the catalyst have a long catalytic activity life.

The object of the present invention is to provide a catalyst for reducing nitrogen oxides with ammonia, having a long catalytic activity life, and a process for catalytically reducing nitrogen oxide with ammonia, being capable of continuously performing over a long period of time.

The above object can be attained by a catalyst and process of the present invention. The catalyst of the present invention comprises an iron-chromium-oxygen type catalyst base and 0.1 through 20% of aluminium sulfate, based on the weight of the above-mentioned catalyst base.

The process of the present invention can be carried out by using the catalyst of the present invention. That is, the process of the present invention comprises mixing nitrogen oxide-containing gas with ammonia gas and bringing the resulting gas mixture into contact with a catalyst which comprises an iron-chromium-oxygen type catalyst base and 0.1 through 20% of aluminium sulfate based on the weight of the above-mentioned catalyst base at a temperature of 150° C or higher.

The iron-chromium-oxygen type catalyst base may be produced by any of the conventional methods. For example, the catalyst base may be prepared by calcining a mixture of at least one iron compound selected from iron salts, iron hydroxides and iron oxides and at least one chromium compound selected from chromium salts, chromium hydroxides and chromium oxides, at a temperature not higher than 500° C. The iron salts and chromium salts are preferably selected from salts of iron and chromium which can, respectively, be easily thermally decomposed. The calcining operation is effected at a temperature not higher than 500° C, preferably, 300° to 500° C, for 1 to 5 hours, preferably, 2 to 4 hours. The catalyst base is composed of iron, chromium and oxygen atoms. The catalyst base preferably has a ratio by atom of iron to chromium ranging between 1:0.02 and 0.04:1, more preferably, between 1:0.03 and 0.1:1.

In order to provide the catalyst of the present invention, the catalyst base is admixed with 0.1 through 20% of aluminium sulfate based on the weight of the catalyst base. The aluminium sulfate is effective for promoting the catalytic activity of the catalyst base for reducing nitrogen oxides with ammonia. The aluminium sulfate may be admixed with the afore-mentioned mixture of the iron and chromium compounds and, thereafter, the admixture may be calcined under the conditions mentioned hereinbefore. The aluminium sulfate may be admixed with the catalyst base which has been calcined. The admixture may be, if necessary, dried and calcined. The calcining operation for the admixture is preferably carried out at a temperature lower than the calcining temperature for the catalyst base but not higher than 500° C, and more preferably, between 100° and 450° C, for 1 to 5 hours.

The catalyst of the present invention has no limitation in its form. What is, the catalyst may be in the form of powder, grains, granules, pellets or tablets. Further, the catalyst may be carried on a carrier, for example, silicon carbide, pumice, silica, alumina, silica-alumina cordierite, mullite, zircon and zirconia.

The process of the present invention is carried out by mixing nitrogen oxides-containing gas with ammonia and bringing the resulting gas mixture into contact with the catalyst mentioned hereinbefore at a temperature of 150° C or higher, preferably, between 170° and 450° C. The reducing reactions of nitrogen oxides by ammonia are carried out in accordance with the following equations.

$$6NO + 4NH_3 \rightarrow 5N_2 + 6H_2O$$

$$6NO_2 + 8NH_3 \rightarrow 7N_2 + 12H_2O$$

$$NO + NO_2 + 2NH_3 \rightarrow 2N_2 + 3H_2O$$

From the above equations, it is obvious that the ammonia should be mixed with the nitrogen oxides-containing gas in such a manner that the ratio by mole of ammonia and nitrogen oxide in the resulting gas mixture is 0.6 to 1.4:1.0.

The catalyst of the present invention has the following advantages.

(1) Higher catalytic activity for reducing nitrogen oxides with ammonia than the simple catalyst base.

(2) High stability against sulphur or sulphurcontaining compounds in the gas to be clarified.

(3) Long life in catalytic activity.

(4) Low cost and simple operation.

The following specific examples will serve to more fully explain the practice of the present invention. However, it will be understood that these are only examples and in no way limit the present invention.

EXAMPLE 1

A catalyst was prepared by the following procedures. An aqueous solution was prepared by dissolving 1,106.8g of ferric nitrate [Fe(NO$_3$)$_3$·9H$_2$O] and 164.5g of chromium nitrate [Cr(NO$_3$)$_3$·9H$_2$O] in 25 liters of water. The ratio by atom of Fe to Cr in the solution was 1:0.15. An aqueous solution of 10% by weight of sodium hydroxide was added dropwise to the above-prepared solution while agitating. A co-precipitate of ferric hydroxide and chromium hydroxide was obtained. The resultant coprecipitate was separated from the solution mixture by filtering, washed with water, dried at a temperature of 110° C and, then, calcined in the atmosphere at a temperature of 340° C for 4 hours. An iron-chromium-oxygen type catalyst base was obtained. The catalyst base was uniformly admixed with 5%, based on the catalyst base, of aluminium sulfate calculated in terms of the anhydride thereof and a small amount of water. The admixture was dried at a temperature of 110° C and, thereafter, re-calcined at a temperature of 180° C for 4.5 hours. The resultant catalyst was crushed into grains and the grains were screened to collect the grains having a 6 through 8 mesh size.

A reducing column was prepared using the following procedures. A quartz tube having an inside diameter of 21 mm was charged with 10 ml of the above-prepared catalyst grains. A thermoelectric thermometer was embedded in a center portion of the stratum of the catalyst grains. The quartz tube was externally heated so that the catalyst grain stratum was raised to a predetermined temperature of 200° C and maintained at the predetermined temperature. Thirty minutes after the catalyst grain stratum had reached 200° C, a mixture gas containing 1,000 ppm of nitrogen monoxide, 1,100 ppm of ammonia, about 3% by volume of oxygen and the balance consisting of nitrogen, was flowed through the reducing column at a space velocity of 15,000 hr$^{-1}$ (N.P.P.). The contents of nitrogen monoxide in the mixture gas at the inlet and outlet of the reducing column were measured by a chemiluminescence type analytical apparatus for nitrogen monoxide. Reduction percentage was calculated in accordance with the following equation.

$$\text{Reduction percentage} = \frac{X_1 - X_2}{X_1} \times 100$$

wherein $X_1$ represents a content of nitrogen monoxide in the mixture gas at the inlet of the reducing column and $X_2$ represents a content of the nitrogen monoxide in the mixture gas at the outlet of the reducing column.

The same reducing procedures as above were repeated three times at temperatures of 250° C, 300° C and 350° C.

For comparison, the reducing procedures identical to those above were repeated without using aluminium sulfate.

The results are shown in Table I.

Table 1

| Reducing temperature (° C) | | 200 | 250 | 300 | 350 |
|---|---|---|---|---|---|
| Reduction percentage | Example 1 | 90.5 | 98.2 | 93.2 | 91.4 |
| | Comparison example | 77.8 | 78.9 | 81.0 | 77.2 |

EXAMPLE 2

A catalyst was prepared using by the following procedures. An aqueous solution was provided by dissolving 3,500 g of ferrous sulfate (FeSO$_4$·7H$_2$O) and 120 g of chromium trioxide (CrO$_3$) in 50 liters of water so that a ratio by atom of Fe to Cr in the solution was 1:0.0945. An aqueous solution of 10% by weight of sodium hydroxide was added dropwise to the above-prepared solution while stirring so that hydroxides of iron and chromium and oxides of iron are co-precipitated from the solution mixture. The resultant co-precipitate is separated from the solution mixture by filtering, washed with water, dried at a temperature of 110° C and, then, calcined in the atmosphere at a temperature of 350° C for 5 hours.

The resultant catalyst base was admixed with 5%, based on the weight of the catalyst base, of aluminium sulfate calculated in the terms of anhydride thereof, and a small amount of water. The admixture was dried at a temperature of 110° C, calcined at a temperature of 180° C for 4.5 hours and, thereafter, crushed into grains. The grains were screened to prepare catalyst grains having a 6 through 8 mesh size.

The procedures for reducing nitrogen oxides identical to those in Example 1 were repeated three times using the above-obtained catalyst grains at reducing temperatures of 250°, 300° and 350° C.

For comparison, the reducing procedures identical to those above were carried out, except that no aluminium sulfate was used.

The results are shown in Table 2.

Table 2

| Reducing temperature (° C) | | 250 | 300 | 350 |
|---|---|---|---|---|
| Reduction percentage | Example 2 | 90.0 | 92.7 | 95.1 |
| | Comparison example | 85.7 | 83.7 | 79.3 |

EXAMPLE 3

A catalyst was prepared using the same method as in Example 1, except that aluminium sulfate was used in an amount of 10% based on the weight of the catalyst base and calculated in the terms of anhydride thereof.

The results are shown in Table 3.

Table 3

| Reducing temperature (° C) | 200 | 250 | 300 | 350 |
|---|---|---|---|---|
| Reduction percentage | 81.4 | 93.9 | 99.1 | 98.6 |

EXAMPLE 4

The same catalyst as that in Example 3 was prepared, except that the catalyst was formed into rod-shaped granules each having a diameter of 6 mm and a length of 6 mm.

A reducing tube made of stainless steel and having an inside diameter of 30 mm was charged with 45 ml of the catalyst granules to form a reducing column. A thermoelectric thermometer was placed in a center portion of the reducing column. The reducing column was heated externally to a temperature of 350° C and maintained at this temperature. Thirty minutes after the reducing column reached the temperature of 350° C, a mixture gas consisting of about 1,000 ppm of nitrogen monoxide, about 1,100 ppm of ammonia, about 800 ppm of sulphur dioxide, about 3% by volume of oxygen, about 10% by volume of water, about 10% by volume of carbon dioxide and the balance of nitrogen was fed into the reducing column at a space velocity of 15,000 hr$^{-1}$. In order to test the change in catalytic activity of the catalyst with lapse of time, the reduction percentage of nitrogen monoxide in the mixture gas was measured at stages of 1, 50, 100, 500, 1000 and 5000 hours after the start of the mixture gas feed.

For comparison, the same procedures as above were repeated except that 10% of ferric sulfate, based on the weight of the catalyst base and calculated in the terms of anhydride thereof, was used instead of the aluminium sulfate.

The results are indicated in Table 4.

Table 4

| Lapse of time (hr) | | 1 | 50 | 100 | 500 | 1000 | 5000 |
|---|---|---|---|---|---|---|---|
| Reduction percentage | Example 4 [$Al_2(SO_4)_3$] | 98 | 97 | 96 | 97 | 96 | 96 |
| | Comparison Example [$Fe_2(SO_4)_3$] | 98 | 90 | 87 | 85 | 83 | — |

From Table 4, it is obvious that the catalytic activity of the catalyst of the present invention was stable over a very long period of time, while the catalytic activity of the comparative catalyst containing ferric sulfate in place of aluminium sulfate remarkably decreased with the lapse of time. From these facts, it is evident that the catalyst of the present invention has a very long catalytic activity life.

What we claim is:

1. A catalyst for reducing nitrogen oxides with ammonia, comprising a catalyst base consisting of the oxides of iron and chromium and 0.1 through 20% of aluminum sulfate based on the weight of said catalyst base, said catalyst base having a ratio by atom of iron to chromium ranging between 1:0.02 and 0.04:1.

2. A catalyst according to claim 1, wherein said ratio by atom of iron to chromium is between 1:0.03 and 0.1:1.

3. A catalyst according to claim 1, wherein said catalyst is carried on a carrier selected from the group consisting of silicon carbide, pumice, silica, alumina, silica-alumina, cordierite, mullite, zircon and zirconia.

4. A catalyst according to claim 1, wherein said catalyst base is provided by calcining a mixture of at least one iron compound selected from iron salts, iron hydroxides and iron oxides and at least one chromium compound selected from chromium salts, chromium hydroxides and chromium oxides, at a temperature not higher than 500° C.

5. A catalyst according to claim 4, wherein said calcining temperature for said catalyst base is between 300 and 500° C.

6. A catalyst according to claim 4, wherein said mixture of said iron and chromium compound is further mixed with said aluminum sulfate before said calcining operation for said catalyst base.

7. A catalyst according to claim 4, wherein after the completion of said calcining operation, said calcined catalyst base is admixed with said aluminum sulfate and, then, said admixture is calcined at a temperature not higher than 500° C.

8. A catalyst according to claim 7, wherein said calcining temperature for said admixture is 100 through 450° C.

9. A process for catalytically reducing nitrogen oxides with ammonia, comprising mixing nitrogen oxide-containing gas with ammonia gas and bringing said mixture gas into contact with a catalyst which comprises a catalyst base consisting essentially of the oxides of iron and chromium and 0.1 through 20% of aluminum sulfate based on the weight of the said catalyst base, at a temperature of 150° C or higher.

10. A process according to claim 9, wherein the ratio by mole of ammonia to nitrogen oxides in said mixture gas is 0.6 to 1.4.

11. A process according to claim 9, wherein the temperature at which said mixture gas contacts said catalyst is between 170 and 450° C.

12. A catalyst for catalytically reducing nitrogen oxide with ammonia at a temperature of 150° C or higher comprising a calcined catalyst base consisting of the oxides of iron and chromium and 0.1 through 20% of aluminum sulfate based on the weight of said catalyst base, said catalyst base having a ratio by atom of iron to chromium ranging between 1:0.02 and 0.04:1, and said catalyst mixture having been calcined at a temperature not higher than 500° C.

13. A process for catalytically reducing nitrogen oxides with ammonia comprising mixing a nitrogen oxide containing gas with ammonia gas in a manner whereby the ratio by mole of ammonia and nitrogen oxide in the resulting gas mixture is 0.6 to 1.4:1.0 at a temperature of 150° C or higher in the presence of a calcined catalyst consisting of the oxides of iron and chromium and 0.1 through 20% of aluminum sulfate based on the weight of said catalyst base, said catalyst base having a ratio by atom of iron to chromium ranging between 1:0.02 and 0:04:1, and said catalyst mixture having been calcined at a temperature not higher than 500° C.

* * * * *